Figure 1:
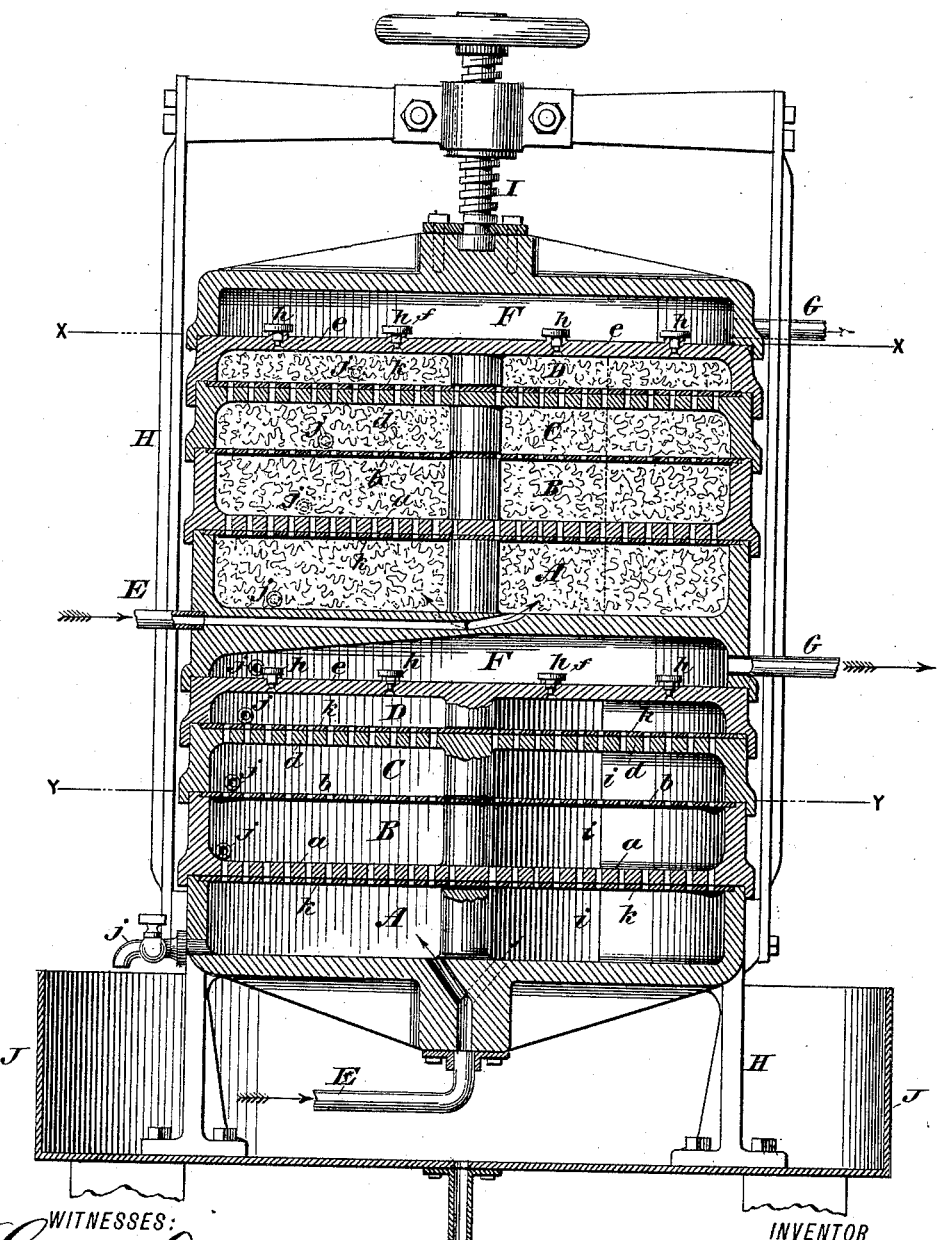

(No Model.) 2 Sheets—Sheet 1.

D. LICHT.
FILTERING PRESS.

No. 421,503. Patented Feb. 18, 1890.

WITNESSES:
Gustav Dieterich.
William Goebel.

INVENTOR
Daniel Licht
BY Briesen, Steele & Knauth
ATTORNEYS (No Model.) 2 Sheets—Sheet 2.
D. LICHT.
FILTERING PRESS.
No. 421,503. Patented Feb. 18, 1890.
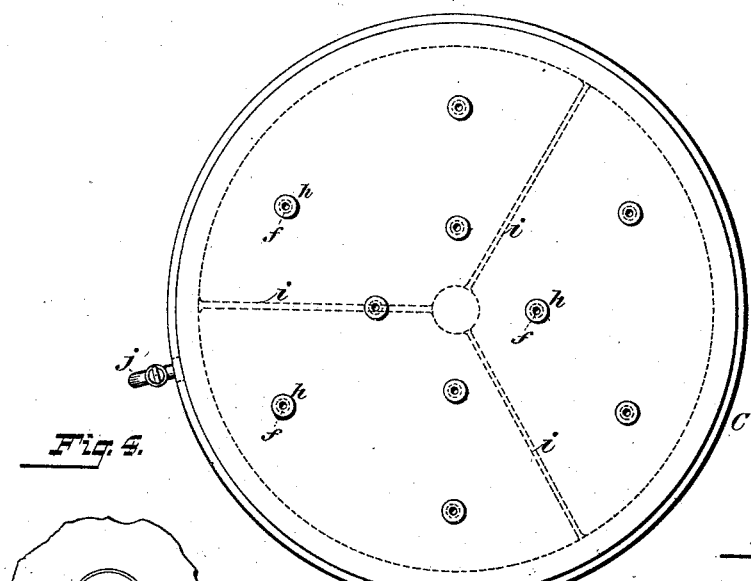
Fig. 2.
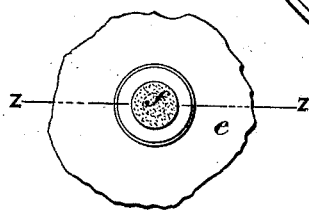
Fig. 4.
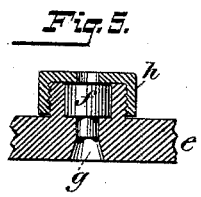
Fig. 5.
Fig. 3.
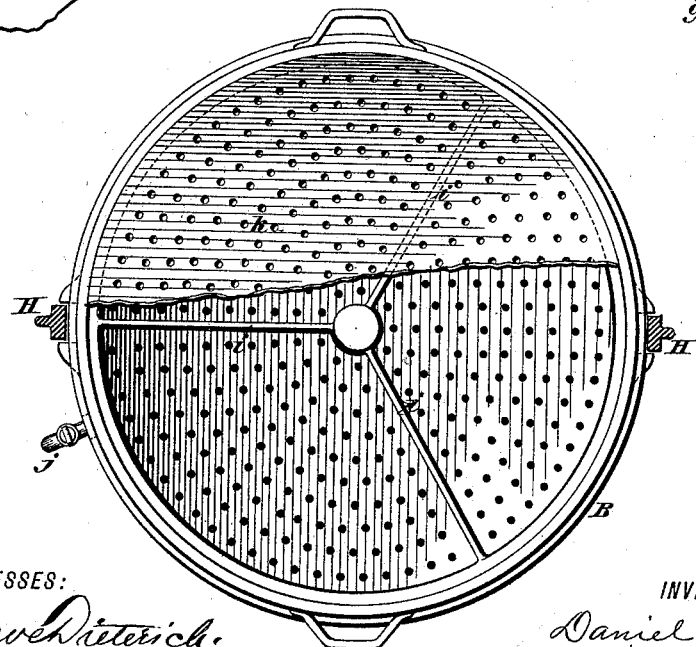
WITNESSES:
Gustave Dieterich
William Goebel
INVENTOR
Daniel Licht
BY Briesen, Steele & Knauth
ATTORNEYS

UNITED STATES PATENT OFFICE.

DANIEL LICHT, OF BROOKLYN, NEW YORK, ASSIGNOR TO JOSEPH GLATZ, OF SAME PLACE.

FILTERING-PRESS.

SPECIFICATION forming part of Letters Patent No. 421,503, dated February 18, 1890.

Application filed September 2, 1889. Serial No. 322,705. (No model.)

*To all whom it may concern:*

Be it known that I, DANIEL LICHT, a resident of Brooklyn, Kings county, New York, have invented an Improved Filtering-Press, of which the following is a specification, reference being had to the accompanying drawings, forming part hereof, wherein—

Figure 1 is a vertical central section of my improved filtering-press. Fig. 2 is a plan or top view looking on that part of the press which is below the line $x\ x$, Fig. 1. Fig. 3 is a plan or top view looking on that part of the press which is below the line $y\ y$, Fig. 1, the top screen or perforated plate directly below said line being partly broken away; and Figs. 4 and 5 are detail views hereinafter more fully referred to.

This invention relates to a filtering-press in which the liquid to be filtered is forced by a considerable pressure in an upward direction through series of perforated plates, between which separate and distinct chambers are formed, all said chambers finally discharging their contents into a receiving-chamber, from which the outlet taking the pure liquid extends.

The invention principally consists in placing in the bottom of said final receiving-chamber a series of rattan plugs as filtering media.

The invention also consists in other details of improvement hereinafter more fully specified.

In the drawings, Fig. 1, is illustrated a double filtering-press—that is to say, one for filtering two separate columns of liquid—one above the other. I shall describe each press as a unit only. Each press consists of four (more or less) pans A B C D, placed one above the other, each upper pan being shallower than the one next below, as shown. The lowermost pan A receives the liquid to be filtered through a pipe E. The next upper pan B has a perforated bottom $a$. The next upper pan C has a perforated bottom $b$ and a perforated top $d$. The top pan D, whose bottom is formed by the perforated top $d$ of the pan C, contains in its top plate $e$ a series of plugs $f$. Fig. 5 shows the construction of each of these plugs in sectional view, and Fig. 4 is a top view of the same without the cap. Each plug $f$ is made of rattan with the fiber running vertically, and is placed over a hole $g$ in the plate $e$, and is held in place by a perforated cap $h$, that is screwed to a boss projecting from the plate $e$ or otherwise properly held in place.

Above the pan D is the receiving-chamber F, into which the filtered matter finally enters, and from which the outlet-pipe G extends.

Each pan A B C D is or may be divided by radial or other partitions $i$ (see Fig. 3) into a number of compartments of segmental or other form.

The supply-pipe E has as many branches for supplying the liquid to the pan A as said pan A has chambers formed by partitions $i$, so that each of these subdivisions or chambers may receive its own supply of liquid to be filtered.

The pans A B C D are supplied with suitable filtering material, whatever that may be, and the liquid to be filtered is forced under considerable pressure into the pan A, rising through the filtering matter therein, passing through the perforated partition $a$ into the pan B, thence through the perforated partition $b$ into the pan C, and thence through the perforated partition $d$ into the pan D. From the pan D the liquid can only escape into the receiving-chamber F through the pores of the rattan plugs $f$. No other outlet is provided than that which is furnished by these rattan plugs.

It is well known that the pores of rattan plugs are so fine that no foreign matter other than liquid can pass through the same and then only under considerable pressure, and that they are impermeable to liquid in a transverse direction; hence by means of these plugs I avoid the passage of any fibers or other impurity with the liquid into the receiving-chamber F. By having the plugs $f$ held in manner described they are easily removable, and can readily be replaced by others when worn out or clogged.

The system of pans hereinabove described, being placed one above the other, may be used in series, as shown, or singly—that is, only one set of pans A B C D and receiving-chamber F may be used in one press, or as many as desired, one set above the other, the drawings showing two sets. All the pans are placed on a suitable framing H and crowded together by a screw I, which takes hold of the cap of the uppermost receiving-chamber F. When the screw I is turned to lift said cap, each of the remaining pans or vessels may be taken off by hand, suitable handles being provided for the purpose. (See Fig. 3.)

Each of the pans has or may have a test-cock $j$, to enable the attendant to watch the operation of the filtering apparatus; and I also use, by preference, in contact with the perforated bottom $a$ and top $d$, a perforated plate of copper or the like $k$, which serves to retain the filtering mass in the pan to which it appertains before the remaining pan is put in position.

A suitable drip-pan J may be placed below the entire apparatus, as shown.

Having now described my invention, what I claim is—

1. The perforated plate $e$, combined with the rattan plug $f$, placed in its perforation, and with the perforated cap $h$, which holds said plug removably in position, substantially as described.

2. In a filtering-press, the combination of a series of pans A B C D, having perforated partitions between them, with the receiving-chamber F and perforated partition $e$, having rattan plugs $f$ therein, as specified.

DANIEL LICHT.

Witnesses:
A. V. BRIESEN,
HARRY M. TURK.